United States Patent [19]

Toyoda

[11] Patent Number: 5,180,206
[45] Date of Patent: Jan. 19, 1993

[54] STRUCTURE FOR VEHICULAR BODY OF AUTOMOTIVE VEHICLE

[75] Inventor: Nubuo Toyoda, Kakegawa, Japan

[73] Assignee: Suzuki Motor Corporation, Shizuoka, Japan

[21] Appl. No.: 680,312

[22] Filed: Apr. 4, 1991

Related U.S. Application Data

[63] Continuation-in-part of Ser. No. 385,810, Jul. 26, 1989, abandoned.

[30] Foreign Application Priority Data

Jul. 19, 1988 [JP] Japan .............................. 63-95510[U]
Jul. 28, 1988 [JP] Japan ................................ 63-189466

[51] Int. Cl.⁵ .............................................. B62D 23/00
[52] U.S. Cl. .................................... 296/204; 296/195; 280/663
[58] Field of Search ................. 296/195, 204, 209, 29, 296/30; 280/668, 663, 673

[56] References Cited

U.S. PATENT DOCUMENTS

| | | | |
|---|---|---|---|
| 3,068,020 | 12/1962 | Muller et al. ..................... | 280/663 X |
| 3,093,390 | 6/1963 | Muller .............................. | 280/663 X |
| 4,280,717 | 7/1981 | Hanai et al. ........................ | 280/663 |
| 4,563,035 | 1/1986 | Hirakami et al. .................... | 296/195 |
| 4,565,389 | 1/1986 | Kami et al. ......................... | 280/663 |
| 4,652,044 | 3/1987 | Harasaki ......................... | 296/195 X |
| 4,869,527 | 9/1989 | Coddens ............................ | 280/663 |
| 4,875,733 | 10/1989 | Chado et al. ....................... | 296/195 |
| 5,018,780 | 5/1991 | Yoshii et al. .................... | 296/195 X |

FOREIGN PATENT DOCUMENTS

| | | | |
|---|---|---|---|
| 1806402 | 6/1969 | Fed. Rep. of Germany . | |
| 3301235A1 | 8/1983 | Fed. Rep. of Germany . | |
| 128967 | 8/1983 | Japan ................................. | 296/195 |
| 133967 | 8/1983 | Japan ................................. | 296/195 |
| 11971 | 1/1984 | Japan ................................. | 296/195 |
| 15272 | 1/1985 | Japan ................................. | 296/195 |

Primary Examiner—Margaret A. Focarino
Assistant Examiner—Joseph D. Pape
Attorney, Agent, or Firm—McGlew & Tuttle

[57] ABSTRACT

An improved structure employable for the vehicular body of an automotive vehicle, wherein a fitting member in the form of a brace is arranged between a side sill and rear floor side members and the fore end of a lower control arm is secured to the fitting member and the rear floor side members via a suspension bracket. This arrangement permits the side sill and the rear floor side members to be connected to each other via the fitting member and the suspension bracket.

7 Claims, 9 Drawing Sheets

STRUCTURE FOR VEHICULAR BODY OF AUTOMOTIVE VEHICLE

CROSS REFERENCE TO RELATED APPLICATION

The present application is a continuation-in-part application of U.S. application Ser. No. 385,810 filed Jul. 26, 1989, now abandoned.

FIELD OF THE INVENTION AND RELATED ART STATEMENT

The present invention relates to a structure employable for the vehicular body of an automotive vehicle.

In general, an automotive vehicle includes a plurality or rear suspension structures each of which is provided with an upper control arm, a lower control arm or the like so that wheels are turnably supported. The lower control arm is designed in a substantially triangular configuration and the fore end of the lower control arm is threadably engaged via a bracket with a rear floor side member for reinforcing the lower part of the vehicular body. Side sills are arranged at the outer lower part of the vehicular body along the longitudinal direction of the latter. The rear part of the side sill is arranged in parallel to the fore part of the rear floor side member in a spaced relationship.

With the conventional structure for the vehicular body as described above, the fore end of the lower control arm is firmly secured to the lower part of the rear floor side member via a bracket. However, this arrangement gives rise to a drawback that stress is concentrated on the rear floor side member. Since the conventional structure requires that the rear floor side members are arranged inside of the vehicular body to some extent for the purpose of reinforcing a rear floor, it fails to satisfactorily meet a requirement that suspension structures are arranged at the outer parts of the vehicular body as far as possible so as to increase stability of the vehicle during movement of the latter. In addition, the fore part of the rear floor side member and the rear part of the side sill are arranged without any connective relationship established therebetween. Consequently, there is a need of designing the structure for the vehicular body in such a manner as to improve the rigidity of the lower part of the vehicular body and suppress deformation of the latter caused by an outer force.

Hitherto, a cross member is bridged between left-hand and right-hand rear floor side members at a position in the proximity of a suspension mount of the vehicle so that the lower part of the vehicular body assures a strength against outer forces in the presence of the cross member and other components. The cross member is fixedly secured to the rear floor side members by bringing flange portions at opposite ends of the cross member in contact with the side walls of the rear floor side members and fixing the flange portions to the rear floor side members at their contact parts by spot welding.

However, since the aforementioned conventional structure for the vehicular body is such that the flange portions of the cross member are connected simply to the rear floor side members, the cross member and the rear floor side members are connected to each other with a reduced intensity of strength and thereby the vehicular body fails to provide a sufficiently high rigidity against torsion. Consequently, the vehicle has a degraded stability during its movement and moreover it is required to take account of a suitable measure for suppressing vibrations.

OBJECT AND SUMMARY OF THE INVENTION

The present invention has been made with the foregoing background in mind and its object resides in providing a structure employable for the vehicular body of an automotive vehicle which is entirely free from the aforementioned drawbacks.

To accomplish the above object, the present invention provides a structure employable for the vehicular body of an automotive vehicle, wherein a fitting member in the form of a brace is arranged between a side sill and rear floor side members and the fore end of a lower control arm is secured to the fitting member and the rear floor side members via a suspension bracket so that the side sill and the rear floor side members are connected to each other via the fitting member and the suspension bracket.

According to the present invention, the whole outer wall of a reinforcement brace is fixedly secured to a connection portion at which the rear floor side members and the cross member are connected to each other, the connection portion being located in the proximity of a suspension mount.

Since the structure of the present invention is constructed in the above-described manner, it provides the following advantageous effects.

According to one aspect of the present invention, the fore end of a lower control arm is secured to a side sill and rear floor side members via a fitting member and a suspension bracket. Thus, stress exerted on the lower control arm can be distributed to the rear floor side members and the side sill and positions where suspension structures are mounted can be offset toward the outside of the vehicular body more than the conventional structure. Consequently, the present invention can provide excellent stability during movement of the vehicle. Further, since the structure of the present invention is such that the side sill and the rear floor side members are connected to each other via a brace and a suspension bracket, the fitting portion of a lower control arm has an increased intensity of strength for connection and the lower part of the vehicular body has an improved rigidity. Further, the structure of the present invention can provide a high resistance against shock caused by an outer force and reduce a quantity of deformation of the vehicular body.

According to another aspect of the present invention, the whole outer periphery of a reinforcement brace is fixedly secured to a connection portion at which a rear floor side member and a cross member are connected to each other, the connection portion being located in the proximity of a suspension mount portion. Thus, the connection portion at which the rear floor side members and the cross member are connected to each other has an increased intensity of strength for connection. Further, the structure of the present invention can provide an improved rigidity against torsion of the vehicular body. Therefore, an automotive vehicle for which the structure of the present invention is employed has a high strength against shock caused by an outer force and has an excellent stability during its movement. Moreover, the structure of the present invention can reduce vibrations of the vehicular body while enjoying a high reputation of commercial value.

Other objects, features and advantages of the present invention will become more readily apparent from reading of the following description which has been made with reference to the accompanying drawings.

BRIEF DESCRIPTION OF THE DRAWINGS

The present invention is illustrated in the following drawings in which:

FIGS. 1 to 7 illustrate a structure employable for the vehicular body of an automotive vehicle, wherein

FIGS. 8 to 12 illustrate a structure employable for the vehicular body of an automotive vehicle in accordance with other embodiment of the present invention, wherein

DETAILED DESCRIPTION OF THE PREFERRED EMBODIMENTS

Now, the present invention will be described in detail hereinafter with reference to the accompanying drawings which illustrate preferred embodiments thereof.

Figure 1:
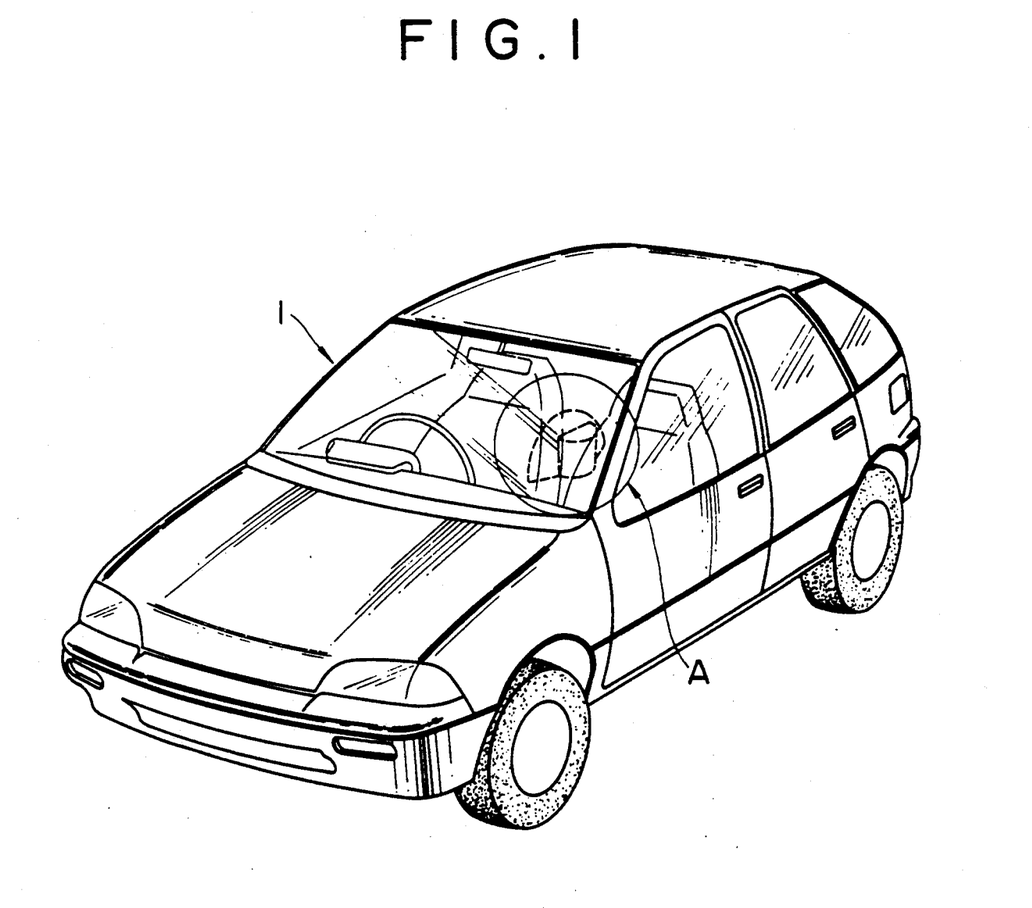
FIG. 1 is a perspective view illustrating a motorcar to which the present invention is applied.
Figure 2:
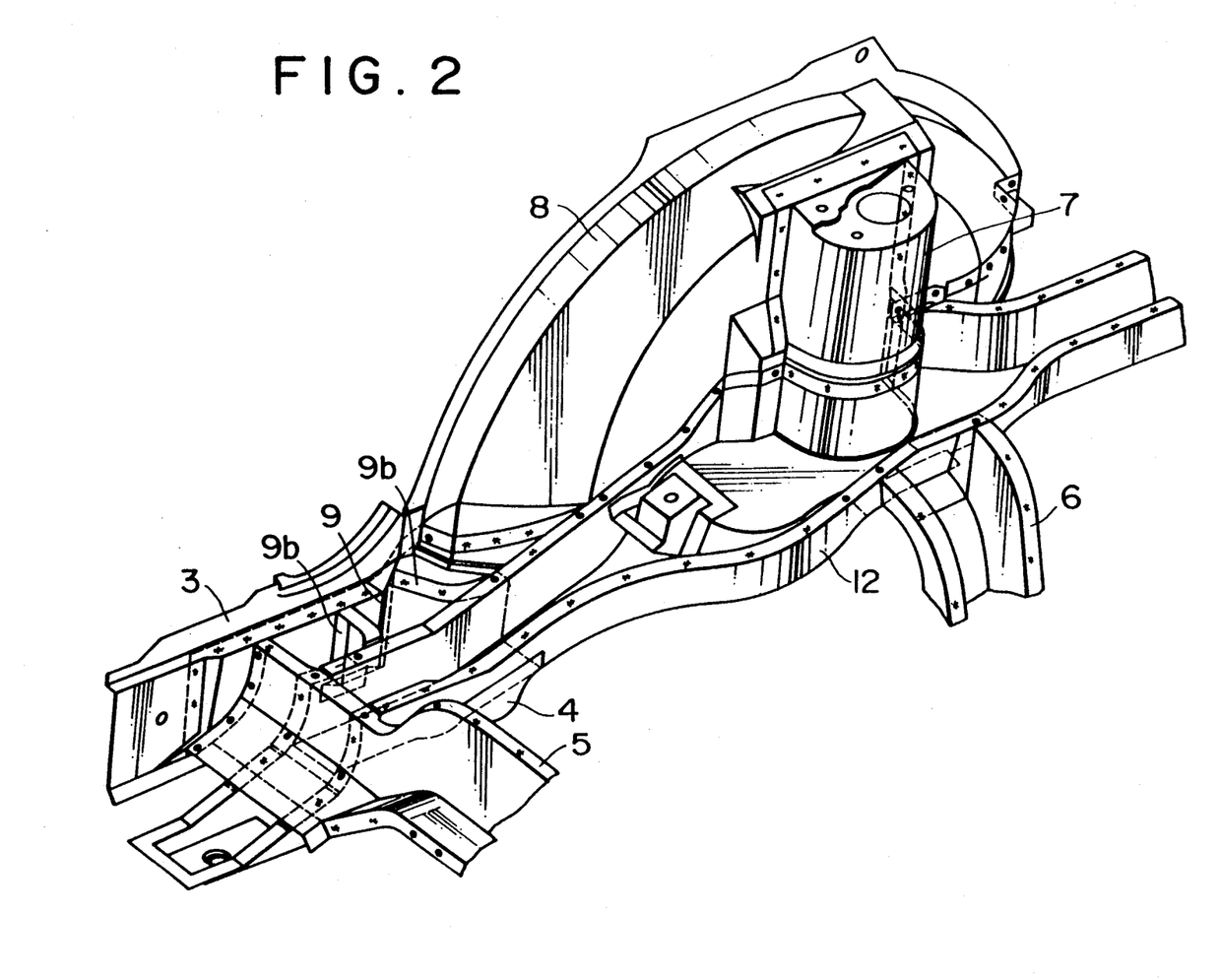
FIG. 2 is a perspective view illustrating the lower part of the vehicular body.

FIGS. 1 to 7 are views which illustrate a structure employable for the vehicular body of an automotive vehicle in accordance with an embodiment of the present invention. In FIG. 1, reference numeral 1 designates a small size motorcar. The motorcar 1 includes a rear floor 2 (see FIG. 7) which extends over a floor surface at the rear lower part of the vehicular body by a process of spot welding (see FIG. 2). The rear floor 2 has first and second rear floor side members 4 and 12 fixed to the lower surface thereof on both of the sides along the longitudinal direction of the vehicle body. The first rear floor side member 4 is arranged in parallel to the side sill 3 at the rear part of the latter in an equally spaced relationship. As shown in FIG. 2, a forecross member 5 and a rear cross member 6 are bridged between the left-hand and right-hand rear front members 4 and 12. The cross members 5 and 6 are provided at the fore-end of the first rear floor side member 4 as well as the intermediate part of a suspension housing 7.

Figure 3:
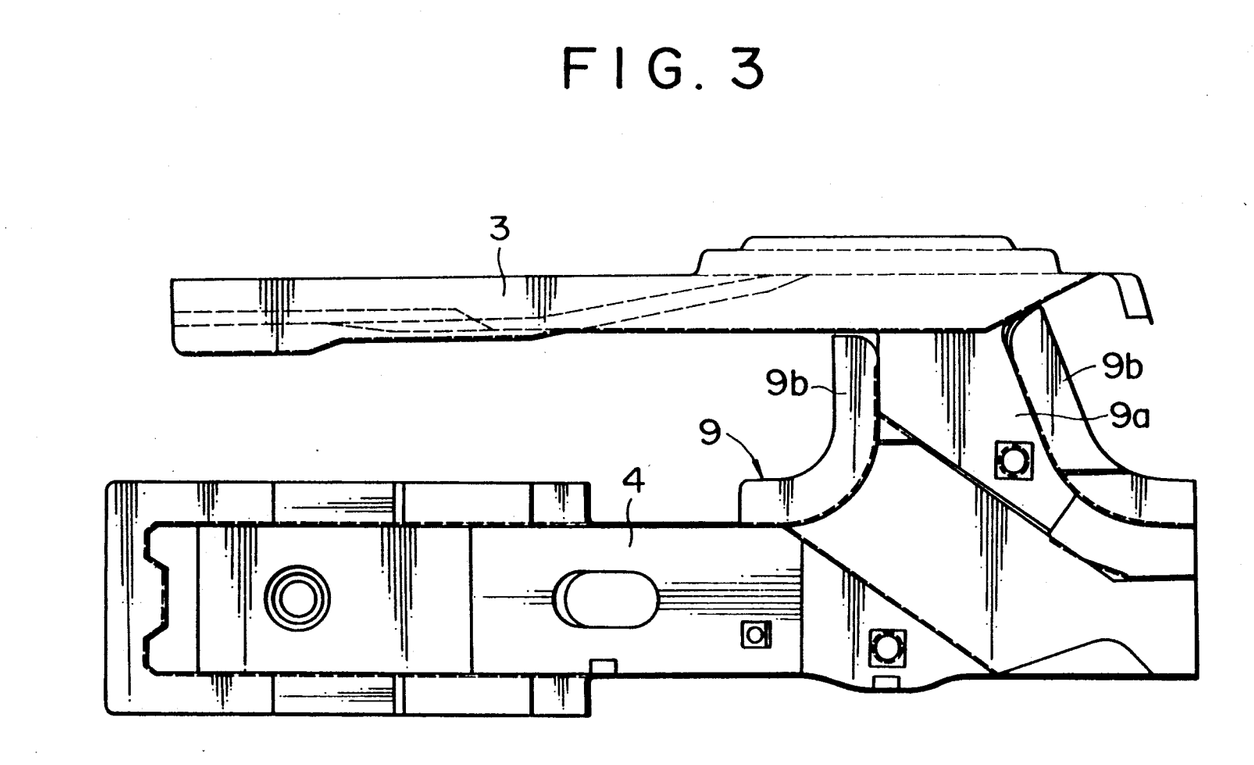
FIG. 3 is a plan view illustrating a brace by way of which a side sill and rear floor side members are connected to each other.
Figure 4:
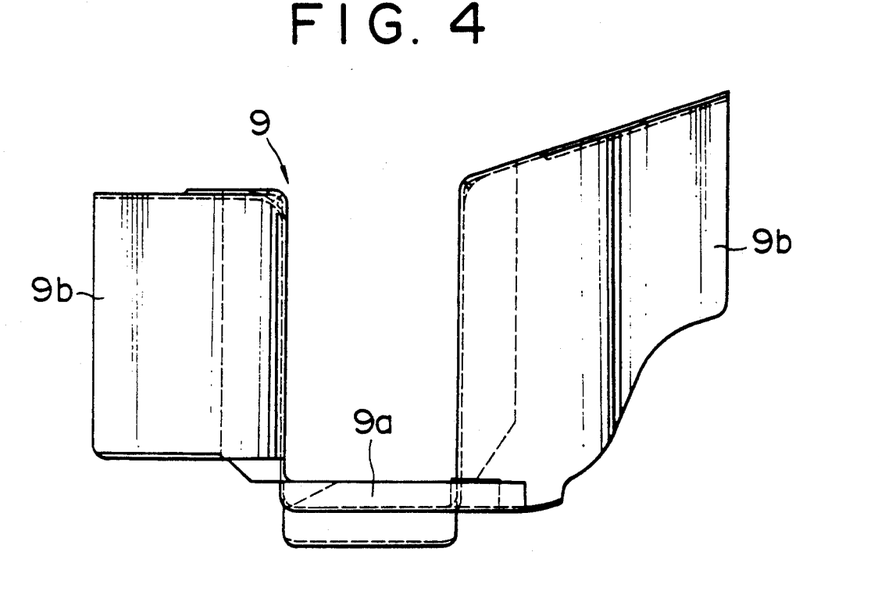
FIG. 4 is a front view of the brace.
Figure 5:
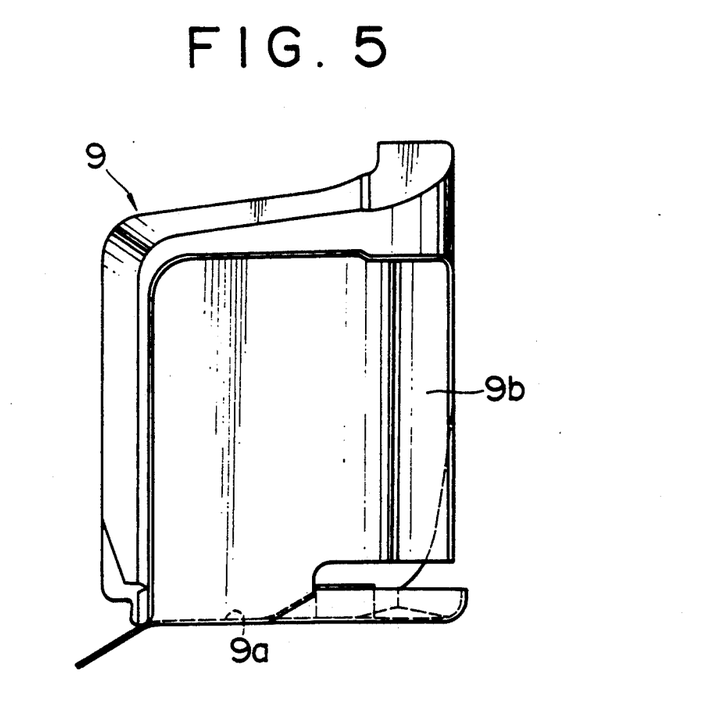
FIG. 5 is a side view of the brace.
Figures 6, 7A:
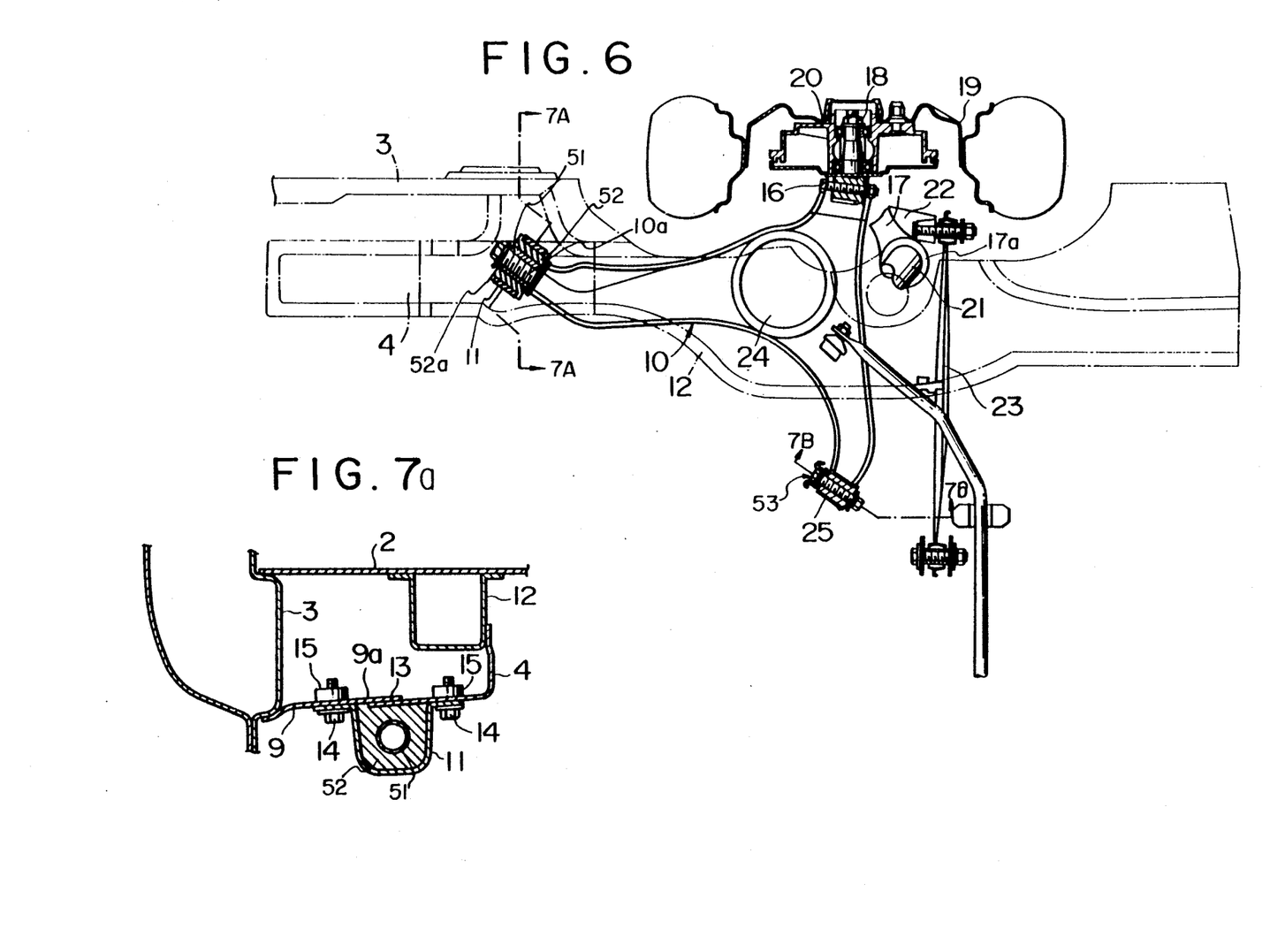
FIG. 6 is a plan view illustrating a positional relationship for securing a lower control arm to the rear floor side members.
FIG. 7a is a sectional view taken above line 7A—7A in FIG. 6.

A brace 9 serving as a fitting member is arranged in a region surrounded by the side sill 3, the rear floor side members 4 and 12, the cross member 5 and a wheel housing 8. As shown in FIGS. 3 to 5, the brace 9 includes horizontally opposed pieces 9b which stand upright on a bottom portion 9a extending therebetween. Each of the opposed pieces 9b is designed in a slightly inward curved configuration, and the outer ends of the opposed members 9b are connected to the side wall and the bottom wall of the side sill 3 by spot welding, while the inner ends of the same are connected to the side wall of the first rear floor side member 4 by spot welding. This arrangement permits the brace 9 to be fixedly secured to the side sill 3 and the first rear floor side member 4. The front end 10a of a substantially triangular lower control arm 10 constituting a rear suspension is resiliently secured to the first rear floor side member 4 and the brace 9 via a suspension bracket 11 through the rubber mount 52 and a collar 51. As shown in FIG. 7a, the first rear floor side member 4 is designed in an inverted L-shaped sectional configuration, and the upper end of the first rear floor side member 4 is connected to the side wall of the second rear floor side member 12 by spot welding, while the lower end of the same is fixedly secured to the bottom portion 9a of the brace 9. The fore end 10a of the lower control arm 10 is firmly secured to the brace 9 and the first rear floor side member 4 by means of bolts 14 and nuts 15 threadably engaged with the latter and, as shown in FIG. 7a, a connection portion 13 at which the brace 9 and the first rear floor side member 4 are connected to each other is located between the bolts 14 and the nuts 15 above the suspension bracket 11.

The front end 10a of the lower control arm 10 is attached to the suspension bracket 11 through the rubber mount 52 embedding the collar 51 therein, as shown in FIG. 6 and 7a. Due to this arrangement, the rubber mount 52 is inserted into the bracket 11 so that said mount 52 cannot be withdrawn outwardly from said bracket 11 by means of the protruded portions 52a at the front and rear surface thereof. The rubber mount 52 and collar 51 provide a fixing seat to receive front end 10a to connect it slantwise with respect to a longitudinal direction of the vehicle or slantwise with respect to the side sill 3.

Figure 7B:
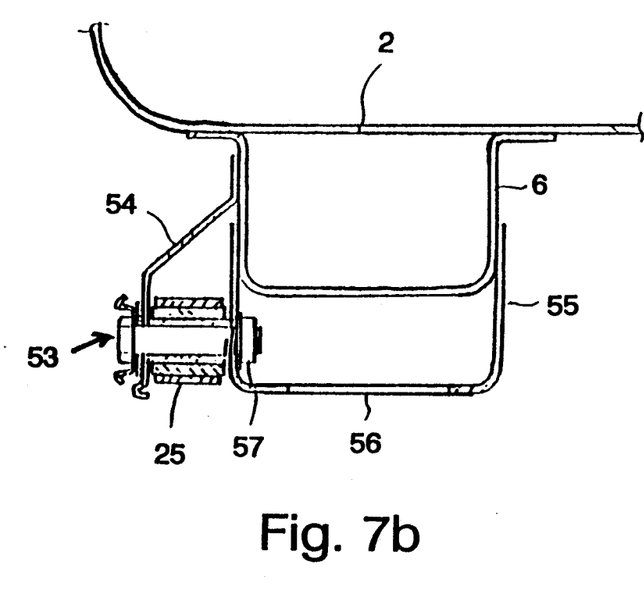
FIG. 7b is a sectional view taken along line 7b—7b of FIG. 6.

Likewise, the other end 25 of the rear side of the lower control arm 10 is attached to a fixing piece 54 and a fixing bracket 55 by fastening means 53, as shown in FIG. 6 and 7b. Then, the fixing piece and fixing bracket are secured to the side surface of the rear cross member 6 whereby the other end 25 of rear side of the lower control arm 10 is arranged between the fixing piece 54 and the fixing bracket 55 so that the other end 25 is supported at the rear cross member 6 through the fixing piece and fixing bracket.

As shown in FIG. 6, a knuckle 17 is secured to one end of the lower control arm 10 on the lower side of the latter. The knuckle 17 is provided with a spindle 18 at its one end on which the hub 20 of a wheel 19 is rotatably mounted (See FIG. 13). The knuckle 17 extends slantwise rearwardly to support a strut 21 at its extension end. Further, the knuckle 17 is formed with a boss 22 at the extension end on which one end of a toe control rod 23 is held. A coil spring 24 is interposed between the central part of the lower control arm 10 and the bottom of the vehicular body. The other end 25 of the lower control arm 10 on the rear side of the latter is resiliently secured to the rear cross member 6.

Figure 13:
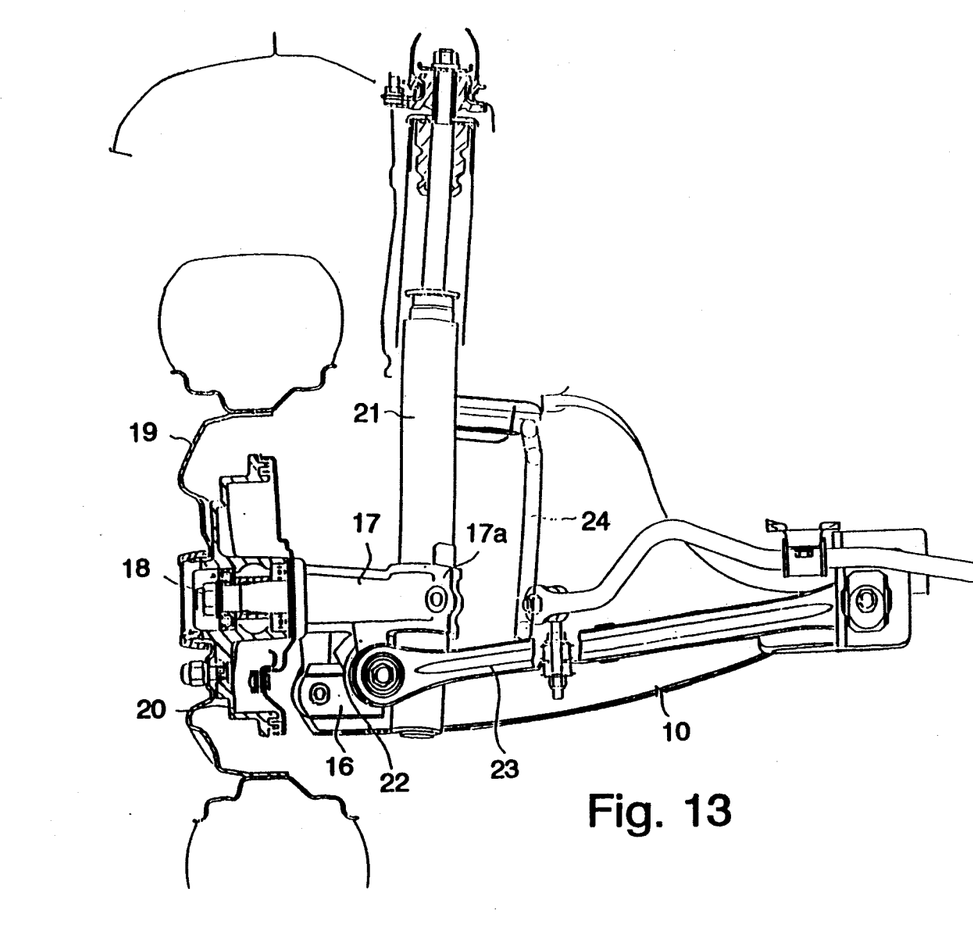
FIG. 13 is a plan view illustrating the connection of the knuckle and the strut.

The knuckle 17 is provided with the spindle 18 at one end and said spindle 18 is attached to the hub of the wheel 19, as shown in FIG. 6 and 13. The other end 17a of the knuckle 17 is formed into a cylindrical shape, in which is inserted the strut 21 whereby the knuckle and strut 21 are connected together.

With such structure for the vehicular body, the suspension bracket 11 for supporting the lower control arm 10 at the fore end of the latter is firmly secured to the side sill and the rear front side member 4 via the brace 9 and the bracket 12. Consequently, stress exerted on the suspension bracket 11 for supporting the lower control arm 10 can be distributed not only to the rear front side member brackets 4 and 12 but also to the side sill 3. In addition, the structure for the vehicular body makes it possible to offset a position where the suspension is mounted on the vehicular body more outward relative to the latter than the conventional structure. Furthermore, since the side sill 3 and the rear floor side members 4 and 12 are connected to each other via the brace 9 and the suspension bracket 11, the side lower part of the vehicular body has an increased rigidity.

Next, FIGS. 8 to 12 are views which illustrate a structure employable for the vehicular body of an automotive vehicle in accordance with another embodiment of the present invention.

Figure 8:
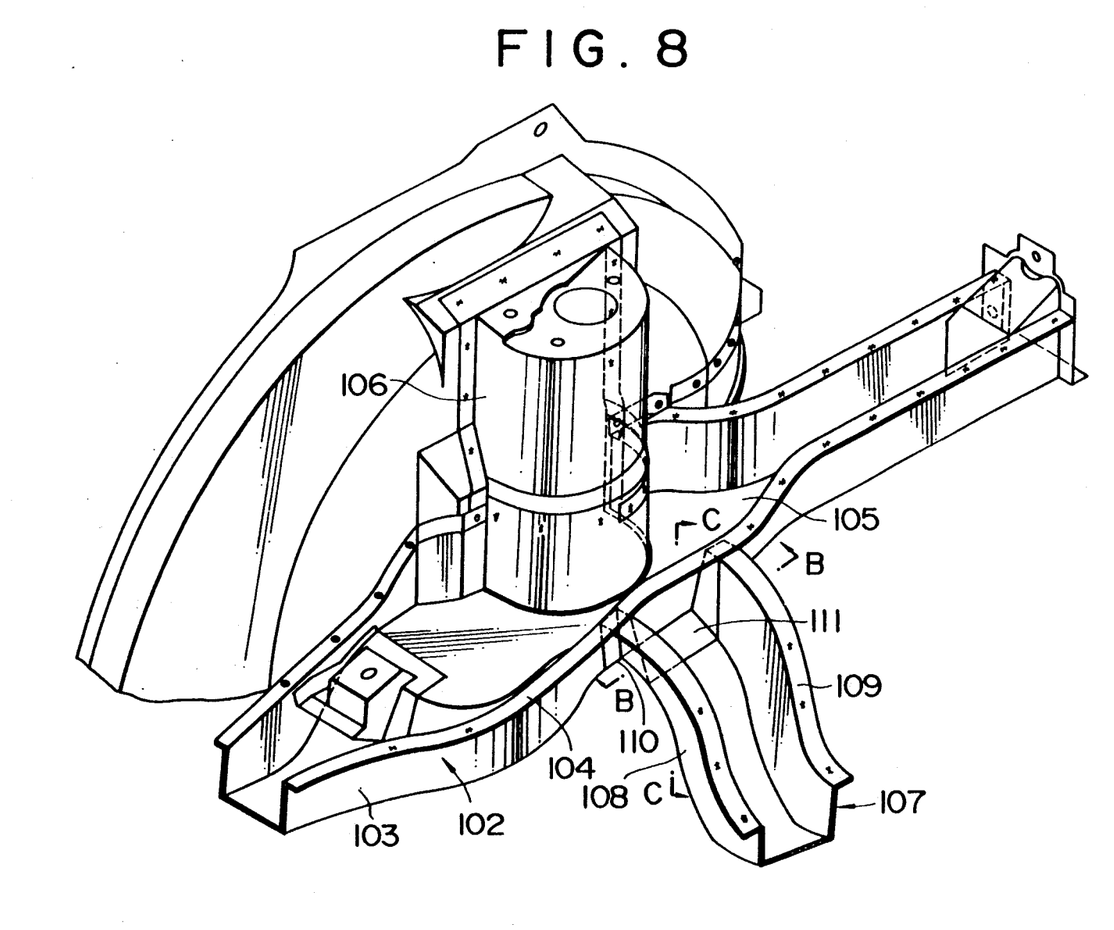
FIG. 8 is an enlarged perspective view illustrating a section A in FIG. 1.

In this embodiment, the motorcar 1 includes rear floor side members 102 at the lower part of the vehicular body on the rear side of the latter along the longitudinal direction of the vehicle body. Each of the rear floor side members 102 comprises a housing 103 having a Channel-shaped cross-section and flange portions 104 extending outwardly of the upper ends of the housing 103 at a substantially right angle in an integral structure. The rear floor side members 102 are arranged on opposite sides of the vehicular body at the lower parts of the latter.

The rear floor side member 102 is formed with a widened portion 105 at the intermediate part as seen in the longitudinal direction thereof so that a suspension mount portion 106 stands upright on the widened portion 105 A cross member 107 is bridged between the left-hand and righthand rear floor side member 102 at a position in the proximity of the suspension mount 106. The cross member 107 comprises a housing 108 having an U-shaped cross-section and flange portions 109 extending outwardly of the upper ends of the housing 108 at a substantially right angle in an integral structure in the same manner as the rear floor side member 102. Opposite ends of the cross member 107 are bent downward at a substantially right angle and their lower ends are bent further outward at a substantially right angle to exhibit a substantially inverted L-shaped configuration.

Figures 9, 10, 11, 12:
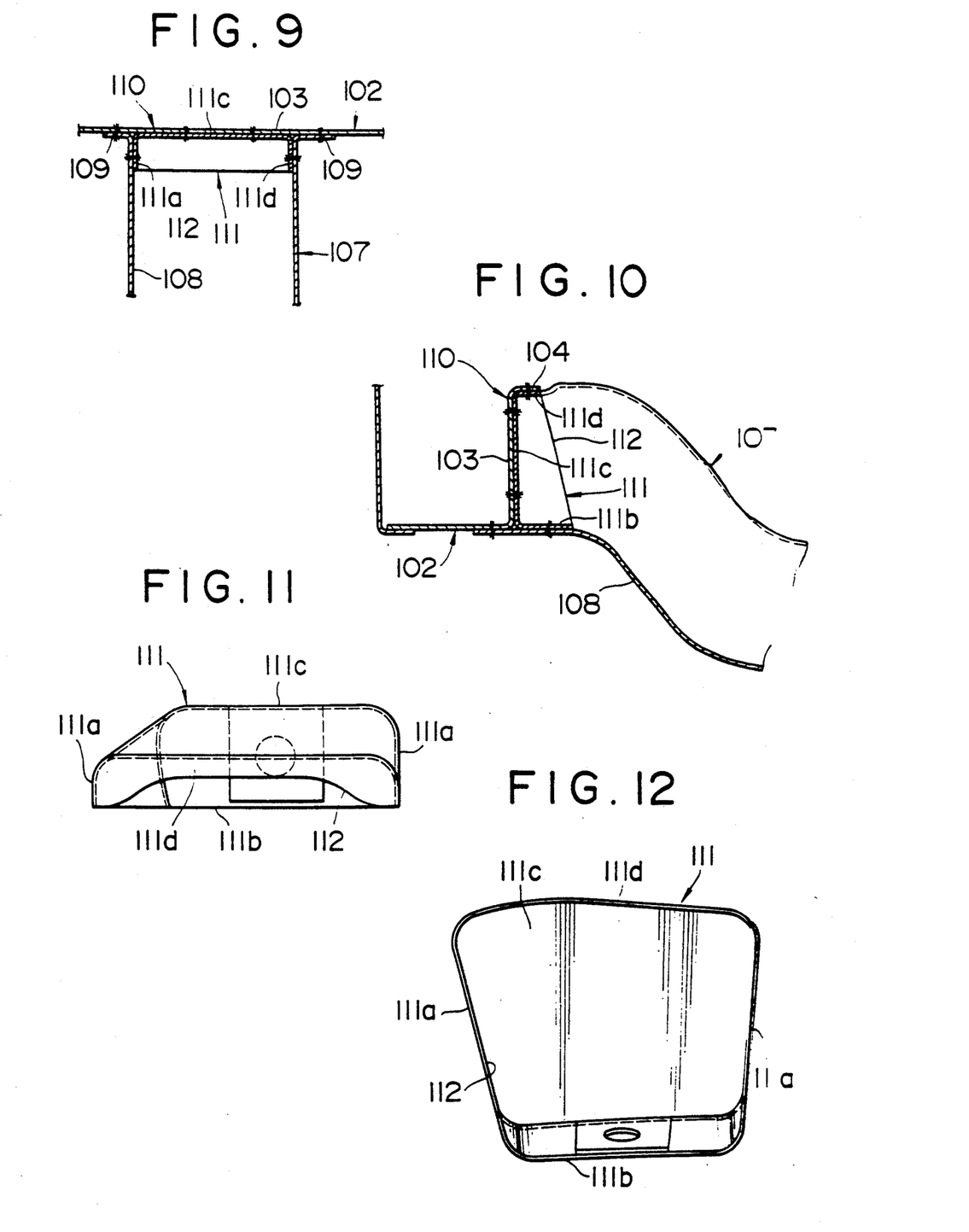
FIG. 9 is a sectional view taken along line B—B in FIG. 8.
FIG. 10 is a sectional view taken in line C—C in FIG. 8.
FIG. 11 is a plan view of a brace.
FIG. 12 is a front view of the brace.

As shown in FIGS. 9 and 10, the cross member 107 is so constructed that end parts of the flange portions 109 come in contact with the side wall of the housing 103 of the rear floor side member 102 and the lower surface of the flange portion 104 of the same and the flange portion 109 of the housing 108 come in contact with the lower surface of the housing 103 of the rear floor side member 102 so that the cross member 107 is fixedly secured to the rear floor side member 102 by spot welding at their contact positions.

A connection portion 110 where the rear floor side member 102 is connected to the cross member 107 has a reinforcement brace 111 as shown in FIGS. 11 and 12 secured thereto. The brace 111 is designed in a box-shaped configuration including an opening portion 112 on one end surface thereof to have dimensions corresponding to those of the inner peripheral surface of the cross member 107. The brace 111 is fitted into the inside of the cross member 107, and as shown in FIGS. 9 and 10, the both side walls 111a and the bottom wall 111b of the brace 111 are connected to the housing 109 of the cross member 107 by spot welding, while the rear wall 111c and the upper wall 111d of the same are connected to the side wall and the flange portion 104 of the rear floor side member 102 by spot welding. Thus, the brace 111 is fixed to the connection portion 110 in an integral structure.

With such structure for the vehicular body, the whole outer wall of the brace 111 is integrally fixed to the rear floor side member 102 and the cross member 107. Consequently, the connection portion 110 can have an increased strength for connection.

While the present invention has been described above with two preferred embodiments thereof, it should of course be understood that it should not be limited only to them but various changes or modifications may be made without departure from the scope of the present invention as defined by the appended claims.

For example, configurations of the brace 11 and the suspension bracket 12 in the first embodiment should not be limited to those as shown in FIGS. 2 to 7 but it may adequately be selected in correspondence to the configurations of the side sill 3 at the rear floor side members 4 and 12.

Additionally, a configuration of the braced 111 in the second embodiment should not be limited only to that as shown in FIGS. 11 and 12 but it may adequately be selected in correspondence to the configuration of the rear floor side member 102 and the cross member 107.

What is claimed is:

1. A suspension structure for a motor vehicle body, comprising: a side sill extending in a longitudinal direction of the vehicle body; rear floor side members; a brace fitting member connected to said side sill and connected to said rear floor side members; a vehicle body rear floor, said vehicle body rear floor being connected to said side sill and connected to said rear side members to connect said side sill and side rear floor side members through said rear floor; a lower control arm including a forward end; a suspension bracket connecting said lower control arm forward end to said brace fitting member, said side sill and said rear floor side members, said bracket defining a fixing seat for receiving said lower control arm forward end, said fixing seat extending slatwise with respect to said side sill.

2. A suspension structure according to claim 1, wherein said side sill, said floor side members and said floor cooperate with said brace fitting member to form a closed cross sectional space thereby dispersing a load from said lower control arm between said side sill, said floor side members and said floor.

3. A suspension structure for a motor vehicle body, comprising: a side sill extending in a longitudinal direction of the vehicle body; connected rear floor side members; a brace fitting member connected to said side sill and connected to said connected rear floor side members; a vehicle body rear floor, said vehicle body rear floor being connected to said side sill and connected to said connected rear side members to connect said side sill and said rear floor side members through said rear floor; a lower control arm including a forward end; a suspension bracket connecting said lower control arm forward end to said brace fitting member, said side sill and said rear floor side members, said bracket defining a fixing seat for receiving said lower control arm forward end, said fixing seat extending at an angle with respect to said longitudinal direction of the vehicle body and extending at an angle with respect to a lateral direction, of the vehicle body.

4. A suspension structure according to claim 1, wherein said side sill, said floor side members and said floor cooperate with said brace fitting member to form a closed cross sectional space thereby dispersing a load from said lower control arm between said side sill, said floor side members and said floor.

5. A suspension structure for a motor vehicle body, comprising: a side sill extending in a longitudinal direction of the vehicle body; a rear floor side member; a brace fitting member extending in a lateral direction between said side sill and said rear floor side member, said brace fitting member being connected to said side sill and being connected to said rear floor side members; a vehicle body rear floor, said vehicle body rear floor being connected to said side sill and being connected to said rear side member to connect said side sill and said rear floor side member through said rear floor; a lower control arm including a forward end; a suspension bracket connected to said brace fitting member and said rear floor side member connecting said lower control arm forward end to said brace fitting member, said side sill and said rear floor side member, said bracket defining a fixing seat for receiving said lower control arm forward end, said fixing seat extending slantwise with respect to said longitudinal direction and said lateral direction of the vehicle.

6. A suspension structure according to claim 1, wherein said side sill, said floor side member and said floor cooperate with said brace fitting member to form a closed cross sectional space thereby dispersing a load from said lower control arm between said side sill, said floor side member and said floor.

7. A suspension according to claim 6, wherein said brace fitting member includes a bottom portion with horizontally opposed pieces extending upwardly therefrom, outer ends of said opposed pieces being spot welded to said side sill and inner ends of said opposed pieces being spot welded to one of said rear floor side members.

* * * * *

UNITED STATES PATENT AND TRADEMARK OFFICE
CERTIFICATE OF CORRECTION

PATENT NO. : 5,180,206
DATED : January 19, 1993
INVENTOR(S) : Nobuo Toyoda

It is certified that error appears in the above-identified patent and that said Letters Patent is hereby corrected as shown below:

On the title page, item (75) inventors, should read :

-- Nobuo Toyoda, Kakegawa, Japan --

Signed and Sealed this

Twenty-first Day of December, 1993

Attest:

BRUCE LEHMAN

*Attesting Officer*          *Commissioner of Patents and Trademarks*